United States Patent
Gupta

(10) Patent No.: US 7,137,708 B2
(45) Date of Patent: Nov. 21, 2006

(54) INFRA-RED AND ULTRAVIOLET FILTRATION IN PROJECTION SYSTEMS

(75) Inventor: Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 10/876,363
(22) Filed: Jun. 23, 2004

(65) Prior Publication Data

US 2005/0286024 A1  Dec. 29, 2005

(51) Int. Cl.
- *G03B 21/14* (2006.01)
- *G03B 21/28* (2006.01)
- *G03B 21/20* (2006.01)
- *G02F 1/1335* (2006.01)
- *F21V 7/00* (2006.01)

(52) U.S. Cl. .......................... 353/84; 353/98; 353/99; 353/102; 353/121; 349/5; 349/7; 349/8; 362/296

(58) Field of Classification Search .......... 353/30–34, 353/38, 85–87, 97–99, 102, 122, 121; 359/40, 359/41, 634, 638, 487, 490, 494–497; 349/62, 349/5, 7, 8; 348/750–766, 779, 780; 362/558–561, 362/296–311, 341–350, 19

See application file for complete search history.

(56) References Cited

U.S. PATENT DOCUMENTS

| | | | | |
|---|---|---|---|---|
| 2,956,273 A | * | 10/1960 | Fruengel | 340/331 |
| 5,777,804 A | | 7/1998 | Nakamura et al. | 359/727 |
| 5,786,934 A | * | 7/1998 | Chiu et al. | 359/494 |
| 6,547,396 B1 | | 4/2003 | Svardal et al. | 353/8 |
| 6,997,565 B1 | * | 2/2006 | Sekiguchi et al. | 353/102 |
| 2002/0171809 A1 | | 11/2002 | Kurtz et al. | 353/20 |
| 2002/0176255 A1 | | 11/2002 | Yamauchi et al. | 362/99 |
| 2003/0179346 A1 | | 9/2003 | Mihara | 353/31 |
| 2003/0214631 A1 | | 11/2003 | Svardal et al. | 353/8 |

* cited by examiner

*Primary Examiner*—Melissa Jan Koval

(57) ABSTRACT

A method of generating a projection beam for projecting an image includes collimating the projection beam and filtering infra-red or ultraviolet radiation from the projection beam after the projection beam has been collimated.

21 Claims, 5 Drawing Sheets

INFRA-RED AND ULTRAVIOLET FILTRATION IN PROJECTION SYSTEMS

BACKGROUND

Image projection is used in a variety of different applications. For example, electronic slide shows and presentations are frequently projected onto a wall or screen for viewing by a relatively large audience. Additionally, many television and home entertainment systems use an image projected onto a wall or screen to provide a much larger display than is readily available using a monitor or cathode ray tube.

As image data, both still and motion picture, is created and stored digitally, digital projectors have been created that project high quality images onto a viewing surface using digital image data. Examples of digital projectors include digital mirror devices (DMD) and liquid crystal display (LCD) projectors. A DMD uses hundreds of thousands of individually-addressable reflective micro-mirrors to create an image for projection. An LCD projector uses an array of individually driven light absorbing or transmissive LCD panels to create an image for projection.

Both DMD and LCD projectors utilize high intensity lamps and reflectors to generate the light needed for projection. Light generated by the lamp is concentrated as a 'fireball' that is located at a focal point of a reflector. Light produced by the fireball is directed by the reflector into a projection assembly that produces images and utilizes the generated light to project the image onto a viewing surface.

In addition to generating the visible light used for projection, projection lamps also naturally produce both infra-red and ultraviolet radiation. This non-visible radiation is undesirable because it heats up the system, is potentially unsafe for the human eye, and can damage some optical components over time. Consequently, projection systems have typically included infra-red and ultraviolet filters to remove such unwanted components of the projection beam.

SUMMARY

A method of generating a projection beam for projecting an image includes collimating the projection beam and filtering infra-red or ultraviolet radiation from the projection beam after the projection beam has been collimated.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

According to the principles described herein, light generated by a projection system is collimated or substantially collimated before the infra-red and ultraviolet light is filtered out. If the infra-red and ultraviolet filters receive collimated light, the filtration process is made more efficient as is the transmission of desirable visible light frequencies.

As used herein and in the appended claims, a "lens system" is defined as one or more lenses. An "image" means a still image or motion picture being projected with a projection system.

Figure 1:
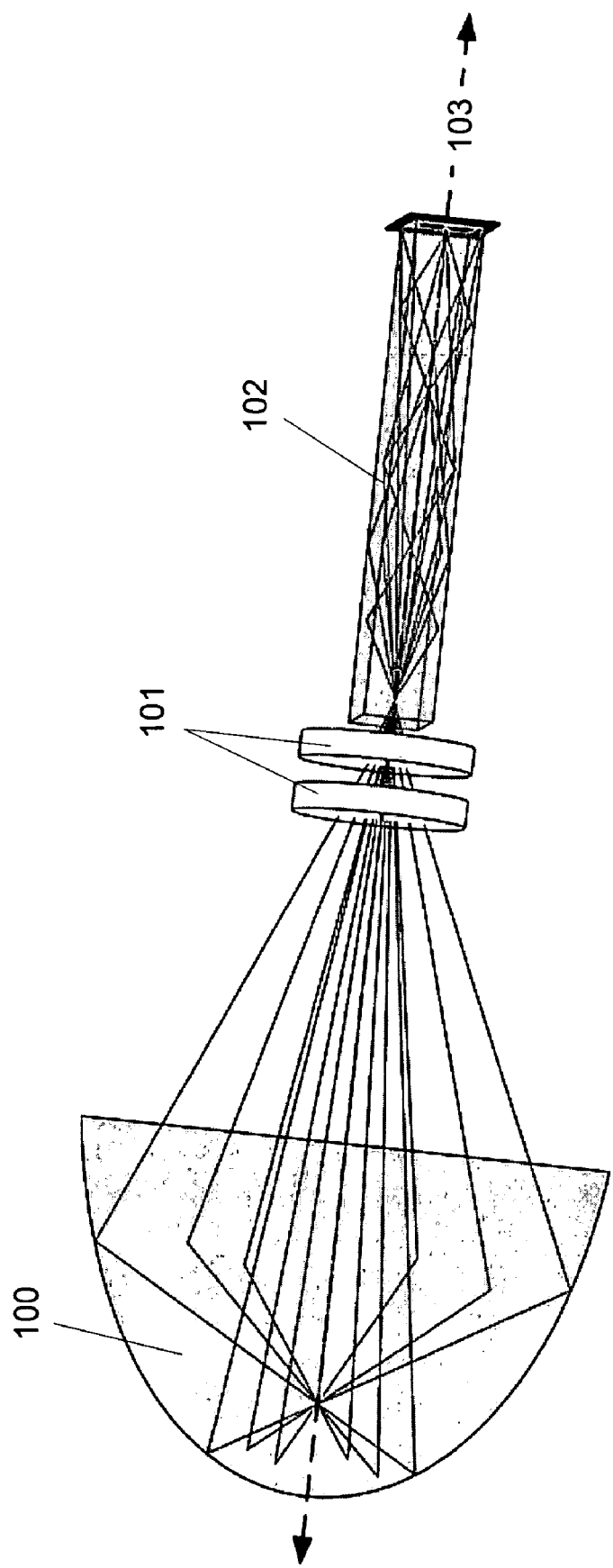
FIG. 1 illustrates a conventional projection system with infra-red and ultraviolet filters receiving non-collimated light from the reflector.

FIG. 1 illustrates a conventional projection system with infra-red and ultraviolet filters receiving non-collimated light from a reflector. As shown in FIG. 1, a conventional projection system includes an elliptical reflector (100) that collects light generated by a projector lamp (not shown) and directs the collected light toward a focus of the ellipse that is represented by the reflector's curvature.

Infra-red and ultraviolet filters (101) are placed near the focus of the elliptical reflector (100). The light collected by the reflector (100) is directed through the filters (101) to substantially remove the infra-red and ultraviolet components of the beam.

The filtered light is then directed into a light-integrating tunnel (102). The tunnel (102) directs the light as a projection beam to the DMD, LCD or other projection image device.

The infra-red and ultraviolet filters (101) filter both infra-red and ultraviolet radiation from the light being directed into the tunnel (102) by the reflector (100). However, as can be seen in FIG. 1, the light from the reflector (100) is incident on the filters (101) at a range of angles. For example, given an optical axis (103) that runs through the center of the reflector (100), filters (101) and light-integrating tunnel (102), light from the reflector (100) may strike the filters (101) at ±30° with respect to the optical axis (103).

Unfortunately, infra-red and ultraviolet filters are only efficient over a significantly smaller angular range. At angles approaching ±30°, the filters (101) are not as effective and begin to allow infra-red and ultraviolet radiation to leak into the light tunnel (102) and the rest of the projection system. This leakage of infra-red and ultraviolet radiation into the system can be substantial.

Additionally, at angles approaching ±30°, the filters (101) also begin to attenuate useful visible light. This attenuated visible light could and should be transmitted to the light tunnel (102) to increase the brightness and color balance of the resulting projection beam.

To improve the effectiveness of the infra-red and ultraviolet filters, it is desirable to collimate the projection light beam being produced before the beam is filtered. If the projection beam is collimated, the light is then incident on the infra-red and ultraviolet filters substantially in parallel with the optical axis, or normal to the faces of the filters. The filters are then much more effective at removing unwanted infra-red and ultraviolet radiation, with significantly less infra-red and ultraviolet radiation leaking into the rest of the projection system. With the filters receiving collimated light, there also is significantly less attenuation of desirable visible light by the infra-red and ultraviolet filters.

The collimation of the projection beam before it is filtered to remove infra-red and ultraviolet radiation can be accomplished in any number of ways within the scope of the present disclosure. Several specific examples follow.

Figure 2:
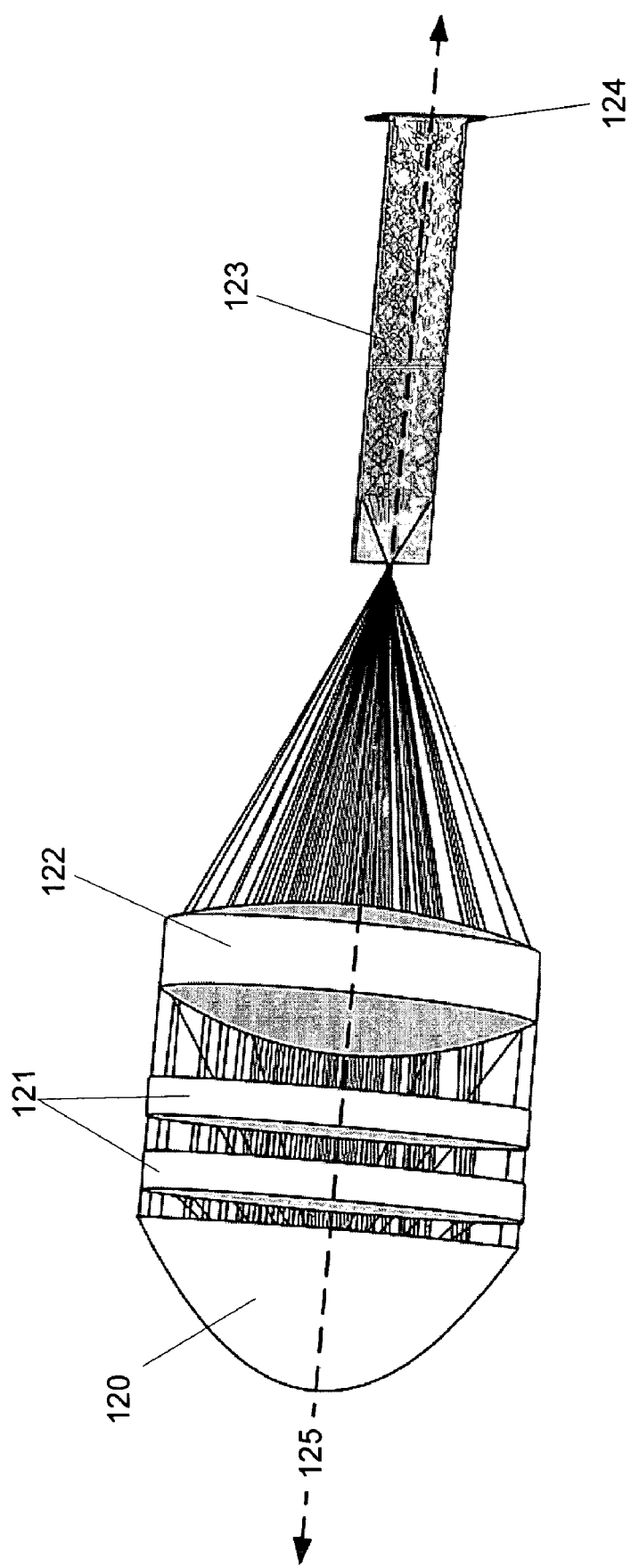
FIG. 2 illustrates a projection system in which a reflector collimates light being input to infra-red and ultraviolet filters according to one exemplary embodiment.

FIG. 2 illustrates a projection system in which a reflector collimates light that is then directed through the infra-red and ultraviolet filters according to one exemplary embodiment. As shown in FIG. 2, the reflector (120) has a parabolic shape, rather than an elliptical shape. Consequently, the light from the projector lamp is collected by the reflector (120) and reflected down the optical axis (125) of the system as a collimated beam.

The collimated beam is then directed through infra-red and ultraviolet filters (121). The infra-red and ultraviolet filters (121) can be in any order along the optical axis (125).

Because the beam incident on the infra-red and ultraviolet filters (121) is collimated, the light passes through the filters substantially in parallel to the optical axis (125) or normal to the faces of the filters (121). Consequently, the filters (121) operate at peak efficiency with respect to removing infra-red and ultraviolet radiation from the projection beam. Additionally, the filters (121) will not significantly attenuate desirable visible light in the collimated projection beam.

After filtering, the projection beam can be passed through an aspheric condenser (122) or similar element. The purpose of the condenser (122) is to focus the projection beam into the light-integrating tunnel (123). As indicated above, the light-integrating tunnel (123) is optically coupled with, and directs the projection beam to, a projection image generator (124), such as a DMD or LCD.

Figure 3:
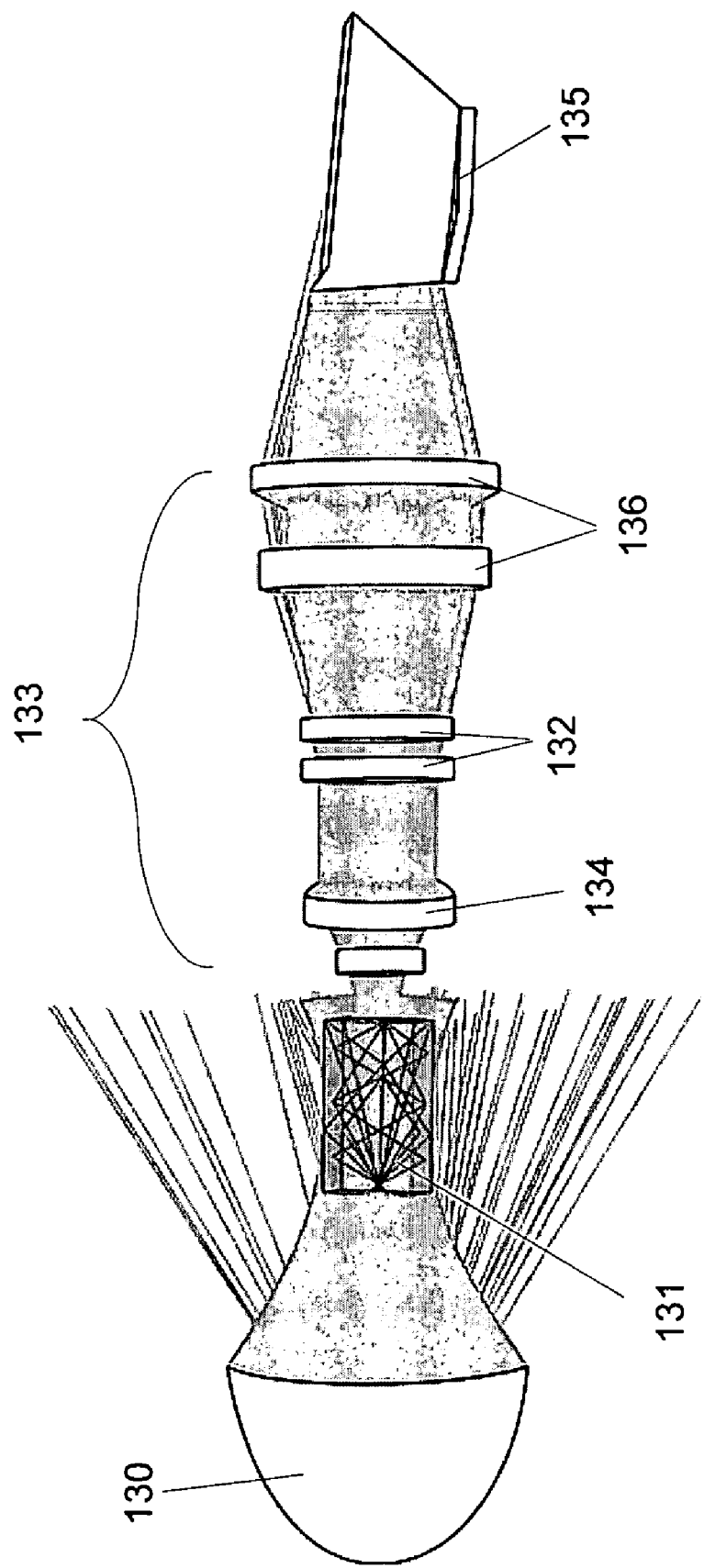
FIG. 3 illustrates a projection system in which the infra-red and ultraviolet filters are included in an illumination relay and receive collimated light according to one exemplary embodiment.

FIG. 3 illustrates another projection system in which the infra-red and ultraviolet filters are included in an illumination relay and receive collimated light according to one exemplary embodiment. As shown in FIG. 3, light is collected by a reflector, such as an elliptical reflector (130). The reflector (130) focuses the projection beam directly into a light-integrating tunnel (131). The entrance to the light-integrating tunnel (131) is placed at or near the focus of the ellipse represented by the curvature of the elliptical reflector (130).

When the projection beam emerges from the light-integrating tunnel (131), the beam passes through an illumination relay (133). The illumination relay (133) directs the projection beam to a projection image generator (135), such as a DMD or LCD.

The illumination relay (133) includes a collimating lens or lens system (134) that collimates the projection beam emerging from the light-integrating tunnel (131). Once the projection beam is collimated, the projection beam is directed through infra-red and ultraviolet filters (132). Again, these filters (132) can be in any order.

Because the beam incident on the infra-red and ultraviolet filters (132) is collimated, the light passes through the filters (132) substantially normal to the face of each filter (132). Consequently, the filters (121) operate at peak efficiency with respect to removing infra-red and ultraviolet radiation from the projection beam. Additionally, the filters (132) will not significantly attenuate desirable visible light in the collimated projection beam.

The illumination relay (133) also includes additional lenses or optics (136) that focus the filtered projection beam onto the projection image generator (135). These elements (136) of the illumination relay (133) will size the projection beam to match the projection image generator (135) and maximize the amount of light incident on the projection image generator (135).

Figure 4:
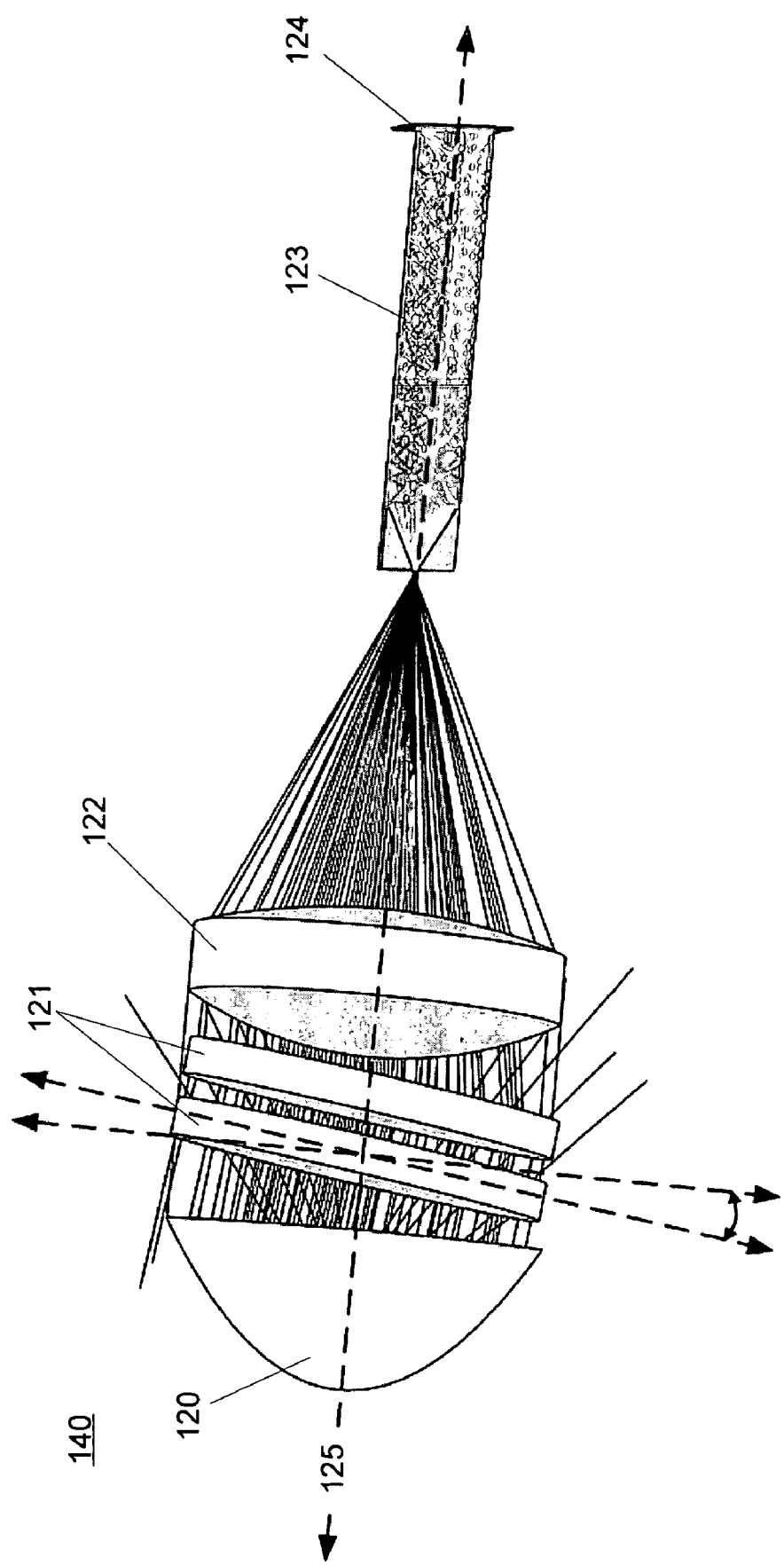
FIG. 4 illustrates a projection system, similar to that of FIG. 2, in which the filters operate by reflecting unwanted radiation off of the optical axis.

FIG. 4 illustrates a projection system, similar to that of FIG. 2, in which the filters operate by reflecting unwanted radiation away from, or off of, the optical axis (125). In FIG. 2, the ultraviolet and infra-red filters (121) operate by using a reflective infra-red and ultraviolet thin film interference coating. This coating reflects the unwanted infra-red and ultraviolet radiation, while transmitting desirable visible light.

This coating can be modified by changing the thickness of the coating layer so that the transmission of visible light still occurs, even when the filter (121) is tilted at an angle with respect to the optical axis (125). With the filters (121) tilted at an angle, the unwanted infra-red and ultraviolet radiation is not transmitted, but is reflected by the filters (121) at an angle to the optical axis (125).

Thus, as shown in FIG. 4, the infra-red and ultraviolet filters (121) are tilted with respect to the optical axis (125). With the filters (121) tilted in this manner, the ultraviolet and infrared radiation is reflected by the filters (121) away from the optical axis (125) at an angle, as shown in FIG. 4. The visible light, however, passes through to the projection optics.

The advantage of this approach is that ultraviolet and infra-red radiation is not reflected back towards the source, i.e., the reflector (120) and lamp. If radiation is reflected back to the reflector (120), this can result in a constant recirculation of infra-red and ultraviolet light which heats up that section of the light engine.

The infra-red and ultraviolet radiation reflected out of the optical axis (125) by the tilted filters (121) can be absorbed by a beam dump (140) positioned separately. In one embodiment, the beam dump (140) can be a black coating on a rough aluminum surface that is cooled off with a cooling fan.

Figure 5:
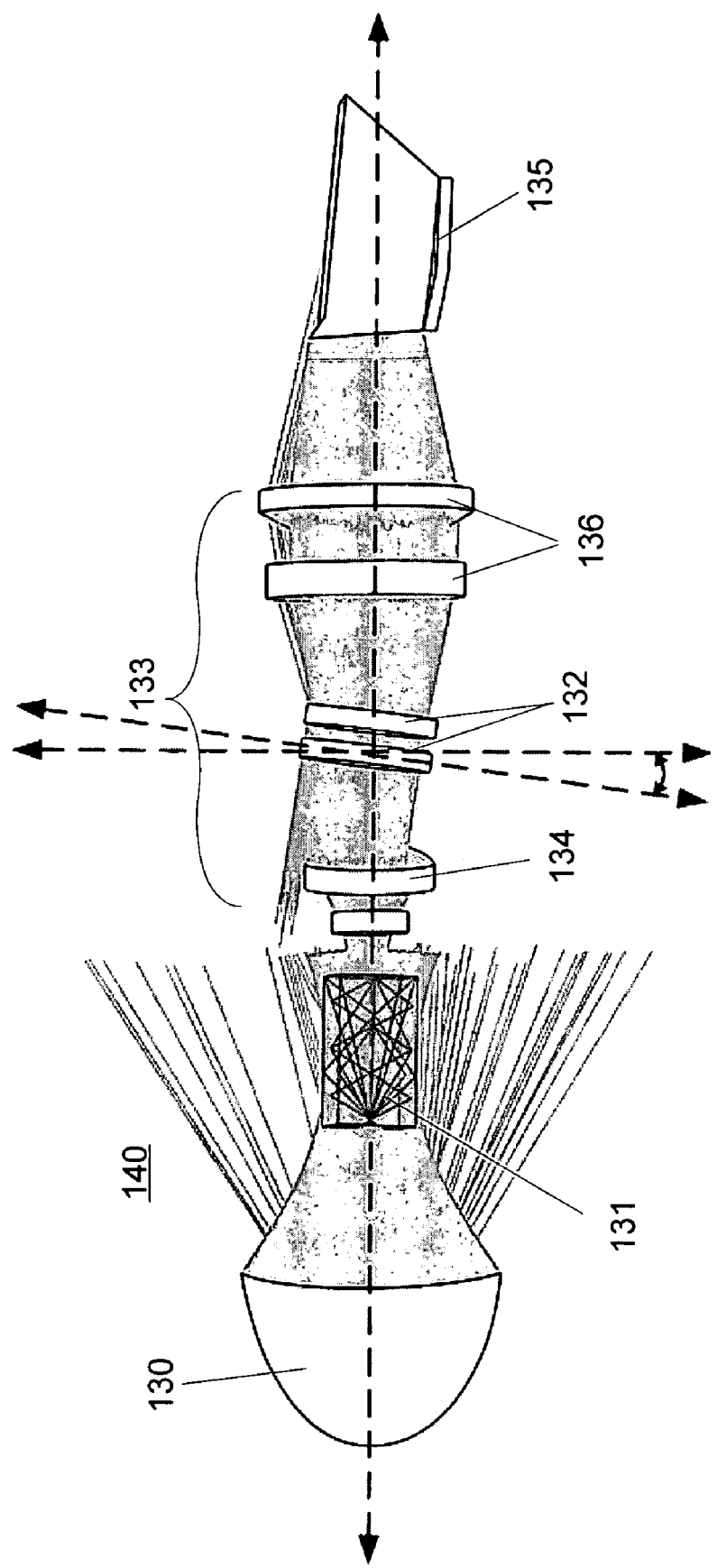
FIG. 5 illustrates a projection system, similar to that of FIG. 3, in which the filters operate by reflecting unwanted radiation off of the optical axis.

FIG. 5 illustrates a projection system, similar to that of FIG. 3, in which the filters operate by reflecting unwanted radiation away from, or off of, the optical axis. As described above with respect to FIG. 4, the infra-red and ultraviolet filters (132) in FIG. 5 are tilted with respect to the optical axis to reflect unwanted infra-red and ultraviolet radiation out of the optical system, perhaps to a beam dump (140). The same advantages result as described above in connection with FIG. 4.

Other systems and methods for collimating a projection beam before filtering to removing infra-red and ultraviolet radiation will be apparent to those of skill in the art with the benefit of this specification. However, any method or system employed to collimate the projection beam prior to filtering to remove infra-red and ultraviolet radiation is within the scope of the present specification and will provide the benefits described herein, namely preventing the leakage of infra-red and ultraviolet radiation into the projection system and preventing the attenuation of desired visible light from the projection beam.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A projection system comprising:
   a collimating reflector for collecting light and directing a collimated projection beam; and
   infra-red and ultraviolet filters for filtering said collimated projection beam, wherein said infra-red and ultraviolet filters are angled with respect to an optical axis, such that infra-red and ultraviolet light is reflected away from the optical axis.

2. The system of claim 1, wherein said reflector is a parabolic reflector.

3. The system of claim 1, further comprising:
a light-integrating tunnel; and
a lens for focusing said collimated projection beam, after filtering, into said light-integrating tunnel.

4. The system of claim 3, wherein said lens is an aspheric condenser.

5. The system of claim 3, further comprising a projection image generator optically coupled to said light-integrating tunnel.

6. The system of claim 5, wherein said projection image generator is a Digital Mirror Device.

7. The system of claim 5, wherein said projection image generator is a Liquid Crystal Display device.

8. The system of claim 1, wherein said infra-red and ultraviolet light is reflected to a beam dump.

9. A projection system comprising:
means for collecting light and directing a collimated projection beam; and
means for filtering infra-red and ultraviolet radiation from said collimated projection beam, wherein means for filtering comprise infrared and ultraviolet filters that are angled with respect to an optical axis, such that infra-red and ultraviolet light is reflected away from the optical axis.

10. The system of claim 9, wherein said means for collecting light and directing a collimated projection beam comprise a parabolic reflector.

11. The system of claim 9, further comprising:
a light-integrating tunnel; and
means for focusing said collimated projection beam, after filtering, into said light-integrating tunnel.

12. The system of claim 9, wherein said infra-red and ultraviolet light is reflected to a beam dump.

13. The system of claim 11, wherein said means for focusing comprise an aspheric condenser.

14. The system of claim 11, further comprising a projection image generator optically coupled to said light-integrating tunnel.

15. The system of claim 14, wherein said projection image generator is a Digital Mirror Device.

16. The system of claim 14, wherein said projection image generator is a Liquid Crystal Display device.

17. A method of generating a projection beam for projecting an image, said method comprising:
collimating said projection beam; and
filtering infra-red or ultraviolet radiation from said projection beam after said projection beam has been collimated, further comprising reflecting said infra-red or ultraviolet radiation away from an optical axis with infra-red and ultraviolet filters that are angled with respect to an optical axis.

18. The method of claim 17, further comprising filtering both infra-red and ultraviolet radiation from said projection beam.

19. The method of claim 17, further comprising collimating said projection beam with a reflector.

20. The method of claim 17, further comprising, with said filters, reflecting said infra-red and ultraviolet light to a beam dump.

21. The method of claim 19, further comprising using a parabolic reflector.

* * * * *